US010362554B1

(12) United States Patent
Kalkunte et al.

(10) Patent No.: US 10,362,554 B1
(45) Date of Patent: Jul. 23, 2019

(54) LOCATION-BASED ACCESS POINT MODULE CONTROL

(71) Applicant: Vivint, Inc., Provo, UT (US)

(72) Inventors: Venkat Kalkunte, Saratoga, CA (US);
Cyril Arokiaraj Arool Emmanuel,
Cupertino, CA (US); Tim Skelton, San
Ramon, CA (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 15/655,755

(22) Filed: Jul. 20, 2017

Related U.S. Application Data

(63) Continuation of application No. 14/481,105, filed on Sep. 9, 2014, now Pat. No. 9,717,067.

(51) Int. Cl.
*H04W 72/08* (2009.01)
*H04W 64/00* (2009.01)
*H04W 16/16* (2009.01)
*H04W 88/08* (2009.01)

(52) U.S. Cl.
CPC ......... *H04W 64/003* (2013.01); *H04W 16/16* (2013.01); *H04W 88/08* (2013.01)

(58) Field of Classification Search
CPC .... H04W 64/003; H04W 16/16; H04W 88/08
See application file for complete search history.

(56) References Cited

U.S. PATENT DOCUMENTS

| 7,149,197 | B2 | 12/2006 | Garahi et al. |
| 7,606,573 | B1 | 10/2009 | Vacon et al. |
| 8,526,993 | B2 | 9/2013 | Bria et al. |
| 8,688,101 | B1 | 4/2014 | Hayes et al. |
| 2005/0003827 | A1* | 1/2005 | Whelan ................. H04W 16/10 455/454 |
| 2006/0291482 | A1 | 12/2006 | Evans |
| 2009/0116511 | A1 | 5/2009 | Anderson et al. |
| 2009/0122753 | A1 | 5/2009 | Hughes et al. |
| 2010/0128630 | A1 | 5/2010 | Barak et al. |
| 2010/0177703 | A1 | 7/2010 | daCosta et al. |
| 2010/0330918 | A1 | 12/2010 | Taghavi Nasrabadi et al. |
| 2012/0129559 | A1* | 5/2012 | Pochop, Jr. ........... H04W 16/18 455/507 |
| 2012/0177027 | A1 | 7/2012 | Venkatraman et al. |
| 2014/0126410 | A1 | 5/2014 | Agarwal et al. |
| 2016/0029305 | A1 | 1/2016 | Kim et al. |

FOREIGN PATENT DOCUMENTS

JP 2013123191 A 6/2013

OTHER PUBLICATIONS

English Machine Translation of JP2013123191A. Jun. 20, 2013.

* cited by examiner

*Primary Examiner* — Mazda Sabouri
(74) *Attorney, Agent, or Firm* — Holland & Hart LLP (57) ABSTRACT

Apparatus and method relating to wireless communication access points are described. In one embodiment an apparatus including one or more antennas to function as an access point for wireless communication is described. In some cases the apparatus or methods may include determining location information and/or one or more operating characteristics of one or more wireless communication access points.

20 Claims, 8 Drawing Sheets

LOCATION-BASED ACCESS POINT MODULE CONTROL

CROSS-REFERENCE TO RELATED APPLICATIONS

This application is a continuation application of U.S. patent application Ser. No. 14/481,105 entitled "LOCATION-BASED ACCESS POINT MODULE CONTROL," which was filed Sep. 9, 2014, which is incorporated by reference herein.

BACKGROUND

Because of ever-developing wireless phone and internet technology, the number of access points used for wired or wireless communications continues to expand. Sometimes creating a new access point interferes with one or more pre-existing access points, including fixed access points. These access points may operate based on certain operational characteristics such as a certain channel. Two access points proximately positioned near each other that utilize the same, or similar, channel frequencies may create co-channel interference. This interference may diminish both the signals and the efficacy of the both access points. This occurs when the access points are close enough that the signals interfere with each other.

Previous systems only employed different wait-and-see response to interference and other associated problems. Service providers had to install a new access point, wait for the customer to complain and notify them, and then work to fix and locate the problem. This reactive, customer-dependent occurrence increased costs, decreased customer satisfaction, and reduced the quality of service.

SUMMARY

According to at least one embodiment, an apparatus for wireless communication is described. In some embodiments the apparatus may include one or more antennas to function as an access point for wireless communication. In some embodiments the apparatus may include a chassis that supports at least one of the one or more antennas. In some embodiments the apparatus may include a global navigation satellite system (GNSS) receiver mounted to the chassis to determine a location of at least one of the one or more antennas. In some embodiments the apparatus may include a processor, memory in electronic communication with the processor, and/or instructions stored in the memory. In some embodiments the apparatus may include instructions being executable by the processor to: determine location information of a first wireless communication access point; and determine one or more operating characteristics of the first wireless communication access point.

In some embodiments the apparatus may include instructions stored in the memory being executable by the processor to receive at least one of location information of one or more wireless communication access points and one or more operating characteristics of the one or more wireless communication access points. In some embodiments the first wireless communication access point and the one or more wireless communication access points may be different.

In some embodiments the apparatus may include instructions stored in the memory further being executable by the processor to correlate the location information of the first wireless communication access point with the at least one of location information of the one or more wireless communication access points and one or more operating characteristics of one or more wireless communication access points.

In some embodiments the apparatus may include instructions stored in the memory further being executable by the processor to correlate the one or more operating characteristics of the first wireless communication access point with at least one of location information of the one or more wireless communication access points and one or more operating characteristics of one or more wireless communication access points. In some embodiments the apparatus may include instructions stored in the memory further being executable by the processor to adjust at least one of the one or more operating characteristics of the first wireless communication access point.

In some embodiments at least one of the one or more antennas receive location information of the one or more wireless communication access points and one or more operating characteristics of the one or more wireless communication access points. In some embodiments the memory stores the location information and the one or more operating characteristics of the one or more wireless communication access points.

In some embodiments the apparatus may include a plurality of light emitting diodes to illuminate based at least in part on correlating the location information of the first wireless communication access point with the location information of the one or more wireless communication access points.

In some embodiments the apparatus may include a plurality of light emitting diodes to illuminate based at least in part on correlating the one or more operating characteristics of the first wireless communication access point with the one or more operating characteristics of the one or more wireless communication access points.

In some embodiments the apparatus may include a plurality of light emitting diodes to illuminate based at least in part on correlating the one or more operating characteristics of the first wireless communication access point with the location information of the one or more wireless communication access points location information of the first wireless communication access point with the location information of the one or more wireless communication access points.

In some embodiments the apparatus may include instructions stored in the memory being executable by the processor to determine location information of a first wireless communication access point at one or more locations. In some embodiments the apparatus may include instructions stored in the memory being executable by the processor to determine one or more operating characteristics of the first wireless communication access point at one or more locations.

In some embodiments the apparatus may include instructions stored in the memory being executable by the processor to adjust at least one of the one or more operating characteristics of the first wireless communication access point based at least in part on determining at least one of one or more operating characteristics of the first wireless communication access point at the one or more locations and one or more operating characteristics of the one or more wireless communication access points.

In some embodiments the apparatus may include instructions stored in the memory being executable by the processor to correlate the location information of the first wireless communication access point at one or more locations with the location information of the one or more wireless communication access points at one or more locations. In some embodiments the apparatus may include instructions stored in the memory being executable by the processor to correlate the operating characteristics of the first wireless communication access point at the one or more locations with the location information of the one or more wireless communication access points at the one or more locations.

In some embodiments the apparatus may include operating characteristics that may include at least one of a signal strength, a signal frequency, a signal sensitivity, or a combination thereof.

In some embodiments correlating the location information of the first wireless communication access point with the location information of the one or more wireless communication access points comprises using the location information of the first wireless communication access point and the location information of the one or more wireless communication access points to determine a proximity value.

In some embodiments the apparatus may include instructions stored in the memory being executable by the processor to correlate the one or more operating characteristics of the first wireless communication access point with the one or more operating characteristics of the one or more wireless communication access points.

In some embodiments correlating the one or more operating characteristics of the first wireless communication access point with the one or more operating characteristics of the one or more wireless communication access points comprises using the operating characteristics of the first wireless communication access point and the operating characteristics of the one or more wireless communication access points to determine an interference value.

According to at least one embodiment, a method for adjusting a signal, such as a radio-frequency signal, is described. In some embodiments the method may include determining location information of a first wireless communication access point at a first location, determining one or more operating characteristics of a first wireless communication access point at a first location, receiving at least one of location information of one or more wireless communication access points and operating characteristics of one or more wireless communication access points, and/or correlating the location information of the first wireless communication access point with at least one of location information of one or more wireless communication access points and operating characteristics of one or more wireless communication access points. In some embodiments the first wireless communication access point and the one or more wireless communication access points may be different.

In some embodiments the method may include adjusting at least one of the one or more operating characteristics of the first wireless communication access point based at least in part on correlating the location information of the first wireless communication access point with at least one of location information of one or more wireless communication access points and operating characteristics of one or more wireless communication access points.

In some embodiments the method may include moving the first wireless communication access point to a second location different from the first location based at least in part on at least one of correlating the location information of the first wireless communication access point at the first location with the location information of the one or more wireless communication access points and correlating the operating characteristics of the first wireless communication access point at the first location with the operating characteristics of the one or more wireless communication access points.

A non-transitory computer-readable storage medium storing computer executable instructions is also described.

When the instructions are executed by a processor, the execution of the instructions may cause the processor to determine location information of a first wireless communication access point, determine one or more operating characteristics of the first wireless communication access point, receive at least one of location information of one or more wireless communication access points and one or more operating characteristics of the one or more wireless communication access points, correlate the location information of the first wireless communication access point with the location information of the one or more wireless communication access points, correlate the one or more operating characteristics of the first wireless communication access point with the one or more operating characteristics of the one or more wireless communication access points, and/or adjust at least one of the one or more operating characteristics of the first wireless communication access point. In some embodiments the first wireless communication access point and the one or more wireless communication access points may be different.

In some embodiments adjusting at least one of the one or more operating characteristics of the first wireless communication access point comprises reducing interference between the first wireless communication access point and the one or more wireless communication access points.

BRIEF DESCRIPTION OF THE DRAWINGS

The accompanying drawings illustrate a number of exemplary embodiments. These drawings are incorporated as part of the specification. Together with the following description, these drawings demonstrate and explain various principles of the instant disclosure. These drawings do not limit the disclosure in any way and should not be construed as limiting—only as exemplary.

While the embodiments described here are susceptible to various modifications and alternative forms, specific embodiments have been shown by way of example in the drawings and are described in detail. The exemplary embodiments described, however, are not limited to the particular forms, details, structures, or other characteristics disclosed. Rather, this disclosure covers all modifications, equivalents, and alternatives falling within the scope of the appended claims.

DETAILED DESCRIPTION OF EXEMPLARY EMBODIMENTS

The systems, the apparatus, and the methods described here relate to wireless communication. More specifically, the systems, the apparatus, and the methods described here relate to preventing signal interference. Some embodiments include determining certain information or characteristics, receiving certain information or characteristics, correlating certain information or characteristics, and/or adjusting certain information or characteristics.

Some embodiments relate to access points for wireless communications and improving responses based on the signals of one or more access points. Channel allocation may be performed to assign a channel to an access point when the access point is installed and at other times. In radio resource management for networks, channel allocation schemes may allocate bandwidth and communication channels to base stations, access points, and/or terminal equipment. This management is designed to achieve maximum system spectral efficiency by potentially reusing certain frequencies while still maintaining the required service by avoiding co-channel interference (CCI) and adjacent channel interference (ACI) among nearby cells or networks.

If another access point within a certain cellular coverage area of the first access point is also allocated to the same channel, one or more access points may experience interference, such as CCI, because of their close proximity. CCI can degrade communications for access points and associated devices. In an example where the access points support wireless frequency transmissions (e.g., Wi-Fi), many access points may be installed in a small area, such as a residential neighborhood or business complex. If there is CCI, customers may report slow or reduced downlink and/or uplink speeds for customer premises equipment (CPE).

Current systems only use a trial-and-error approach, based on reported problems, to resolve co-channel interference. Further, current companies installing new systems select an installation site for an access point without knowing characteristics of other access points or their location. Especially in highly congested areas, selecting new access point sites that will not have transmission problems—like CCI—can be extremely difficult, costly, and time consuming.

The present disclosure provides for intelligent assessments and dynamic changes based on information about multiple access points. The new system may use a location-based system in conjunction with a signal receiving system. In some embodiments the location-based system may be a global positioning satellite (GPS) system and the signal receiving system. When a system is installed as—or as part of—an access point, this system can adjust based on other nearby systems. For example, if access point A was previously installed and now access point B will be installed nearby. If both access points use radio, or other receiver signals, then the signals may effectively conflict and interfere with each other—creating CCI. Rather than installing access point B and waiting for the customer to report the problem and then requiring an adjustment, the present disclosure identifies and anticipates problems based on proximity and potential interference, and then dynamically adjusts.

The present system can be aware (and/or transmit this information through a network to a central analysis location) of access point A's location and signal receiving characteristics and then adjust the signal receiving characteristics of access point B accordingly. Adjusted operating signal characteristics may include but are not limited to power, sensitivity, channel, etc. This adjustment can be made proactively—before a customer or other party highlights any CCI or other problems. Comparing the combined location-based GPS information with the signal receiver characteristics (like channel frequency) of one access point with one or more other access points, the desired signal receiver characteristics can be determined and set. Thus, the new access point B system can be installed, send location and signal information to a network, and the network may adjust the system's signal information. The present systems, apparatus, and associated methods are beneficial as access points constantly change and may be added in already-densely used areas. Previous systems did not use location-based awareness in conjunction with receiver signals and required a wait-and-see problem identification and then a trial-and-error resolution.

The present systems and apparatuses may also use notifications to aid in installation. These notifications may include visual, auditory, tactile, or other notifications. Visual-based notifications may include LED or other lights with varying colors, brightness, or other characteristics. These visual-based notifications may depend on one or more characteristics or inputs from the specific access point, other access points, a combination of the specific access point and other access points, or other sources. As an example, the LED lights may increase in brightness as a signal becomes stronger or may decrease in brightness based on the proximity of another access point having a similar signal receiver characteristic like a channel.

Any discussion of any apparatus, system, method, and/or other characteristic discussed with respect to one type (e.g., apparatus 100) is not limiting and applies to every other discussion of that same type (e.g., an apparatus) or any other type (e.g. a method).

Figure 1:
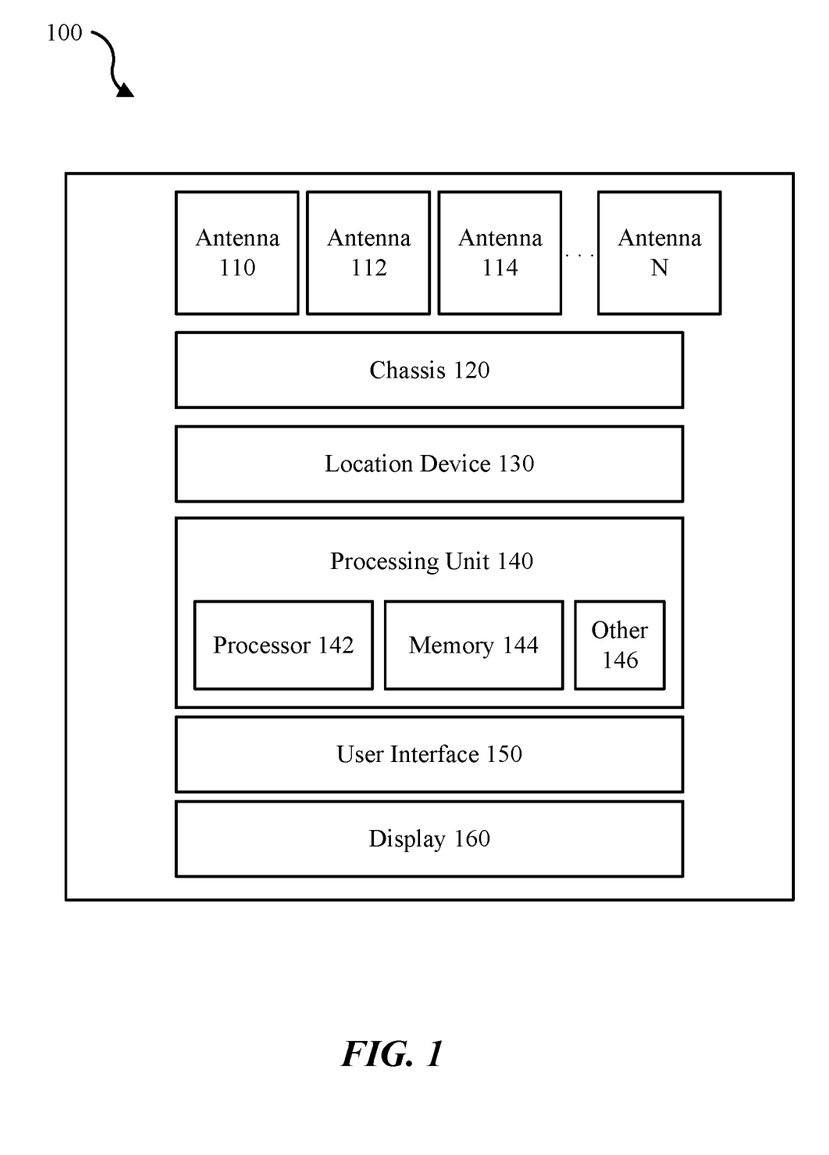
FIG. 1 is a block representation of exemplary apparatus and methods of organization in which the present systems and methods may be implemented.

FIG. 1 is a block representation illustrating one embodiment of an apparatus 100 in which the present systems and methods may be implemented. In some embodiments the systems and methods described here may be performed on or by a device (e.g., apparatus 100). As depicted, the apparatus 100 may include one or more antennas 110, 112, and 114, chassis 120, location device 130, processing unit 140, processor 142, memory 144, other unit 146, user interface, and/or display 160.

In some embodiments apparatus 100 may include one more antennas, such as antenna 110, 112, or 114. These antennas may receive one or more signals. The signals received may include wireless communication signals such as radio frequency, electromagnetics, local area network (LAN), wide area network (WAN), virtual private network (VPN), wireless network (using 802.11, for example), cellular network (using 3G and/or LTE, for example), or other signals. In some embodiments the apparatus 100 may include multiple antennas 110, 112, and 114. These antennas may include or be related to, but are not limited to, WWAN (GSM, CDMA, and WCDMA), WLAN (including Bluetooth and Wi-Fi), WMAN (WiMAX), and WPAN (including UWB and RFID), antennas for mobile communications, antennas for Wireless Personal Area Network (WPAN) applications (including RFID and UWB). In some embodiments each antenna may receive signals or information specific to itself. In other embodiments each antenna may receive signals or information not exclusive to itself. In some embodiments antennas 110, 112, and 114 may communicate with each other. In some embodiments antennas 110, 112, and 114 may only receive communications or information, while in other embodiments the antennas of apparatus 100 may receive and/or transmit communications or information.

In some embodiments chassis 120 may form a frame or a housing for apparatus 100. In some embodiments chassis 120 may include metal, plastic, polymer, another substance, or some combination of one or more of these. In some embodiments chassis 120 may have one or more components of apparatus 100 mounted to it. In some embodiments chassis 120 may support one or more components of apparatus 100 including, but not limited to, antenna 110, location device 130, processing unit 140, processor 142, memory 144, other unit 146, user interface 150, and display 160. In some embodiments chassis 120 may house one or more components of apparatus 100. In some embodiments chassis 120, and apparatus 100, may be portable. In some embodiments chassis 120, and apparatus 100, may be hand-held. In some embodiments chassis 120 may comprise a frame, a structure, a unitary structure, a shell, or a casing.

In some embodiments location device 130 may be one component of apparatus 100. In some embodiments location device 130 may include a global navigation satellite system (GNSS) transmitter and/or receiver. In some embodiments location device 130 may include a Bluetooth technology transmitter and/or receiver. In some embodiments location device 130 may include any other location determinative transmitter and/or receiver.

In some embodiments location device 130 may be able to determine the location of apparatus 100. In some embodiments location device 130 may be able to determine location information of one or more of antennas 110, 112, and 114. In some embodiments location device 130 may be able to determine the location of one or more wireless communication access points, which may be included as part of apparatus 100 or may not be. In some embodiments location device 130 may be able to receive location information of one or more of antennas 110, 112, and 114. In some embodiments location device 130 may be able to receive location information of one or more wireless communication access points, which may be included as part of apparatus 100 or may not be.

In some embodiments processing unit 140 may include a processor 142, memory 144, and an other unit 146. In some embodiments processing unit 140 may be in electronic communication with one or more components with in the processing unit 140 and/or within the apparatus 100. In some embodiments processing unit 140 may include a processor 142 that can process one or more executable instructions stored in the memory 144. The memory 144 may store computer executable instructions that when executed by the processor 142 cause the processor 142 to perform certain steps related to wireless communication access points. In some embodiments steps may include determining location information and/or one or more operating characteristic information, receiving location information and/or one or more operating characteristic information, correlating location information and/or one or more operating characteristic information, and/or adjusting determining location information and/or one or more operating characteristic information. In some embodiments processing unit 140 may be able to determine, receive, process, correlate, and/or adjust certain information related to apparatus 100 or to other wireless communication access points.

In some embodiments apparatus 100 may include a user interface 150. This user interface 150 may be able to receiver inputs from one or more users or to provide responses to one or more user inputs. This user interface 150 may be able to receive one or more inputs from one or more users. User interface 150 may also be able to provide responses based at least in part on one or more user inputs. In some embodiments user interface 150 may include one or more switches, buttons, scanners, actuators, and/or other devices.

In some embodiments apparatus 100 may include a display 160. This display 160 may include an light emitting diode (LED) display. In some embodiments display 160 may include a touch screen. In some embodiments display 160 may include one or more distinct LED lights of varying color, intensity, spacing, shading, location, and/or other characteristics.

Figure 2:
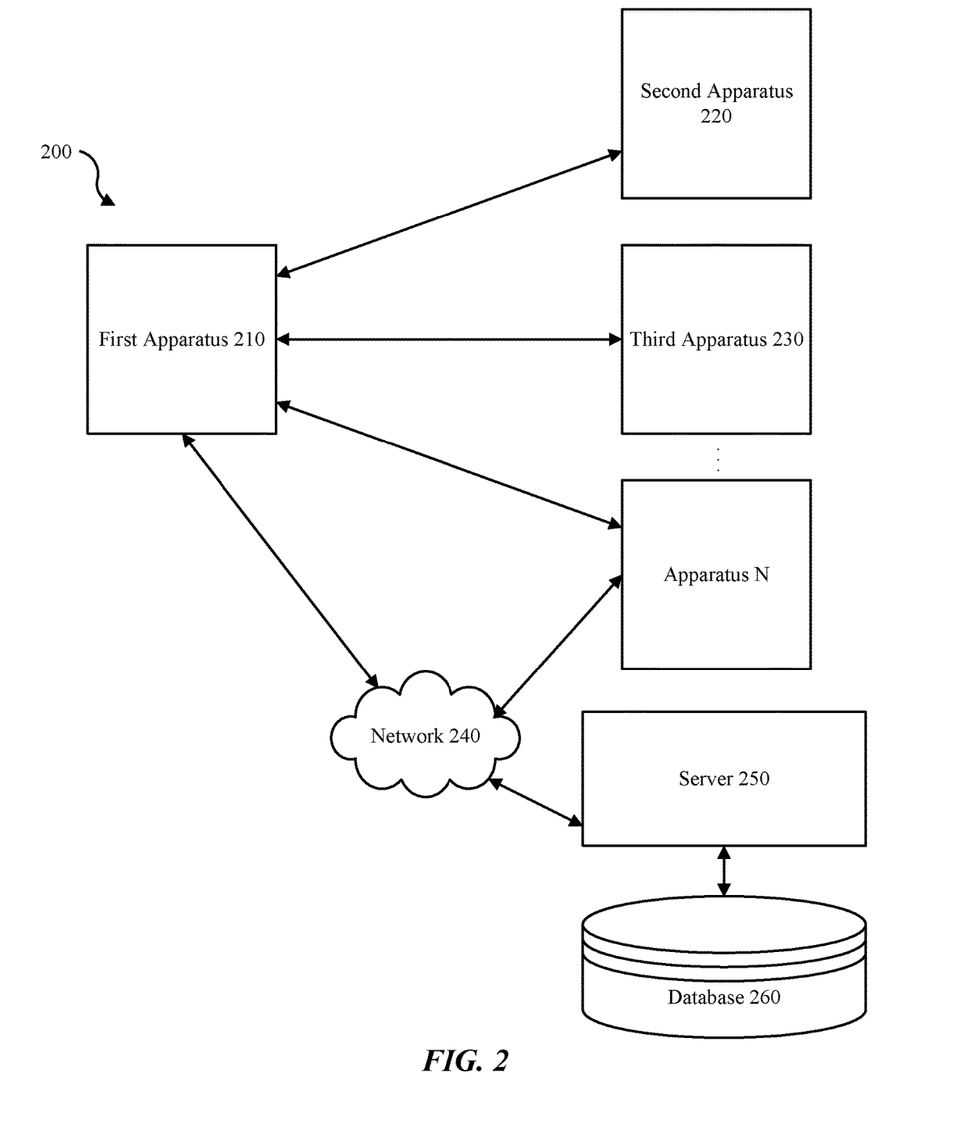
FIG. 2 is a block representation of an exemplary system including apparatus and methods of organization in which the present systems and methods may be implemented.

FIG. 2 is a block representation of an exemplary system including apparatus and methods of organization in which the present systems and methods may be implemented. In some embodiments system 200 may include a first apparatus 210, a second apparatus 220, a third apparatus 230, other apparatus, network 240, server 250, and/or database 260.

In some embodiments apparatus 210, 220, 230, and others may include some or all of the characteristics discussed here with respect to apparatus 100. In other embodiments apparatus 210, 220, 230, and others may include entirely different characteristics than apparatus 100.

In some embodiments apparatus 210 may be able to receive information from one or more wireless access points. In some embodiments apparatus 210 may be able to receive information from one or more of apparatus 220, 230, or others. In some embodiments apparatus 210 may be able to send and/or receive information from one or more wireless access points. In some embodiments apparatus 210 may be able to send and/or receive information from one or more of apparatus 220, 230, or others.

In some embodiments apparatus 210 may be able to receive information from network 240. This network 240 may facilitate communication between one or more of the apparatus 210, apparatus 220, 230, or others, server 250, and database 260. In some embodiments one or more of apparatus 210, 220, 230, and others may communicate with server 250 via network 240. Examples of network 240 may include any combination of cloud networks, local area networks (LAN), wide area networks (WAN), virtual private networks (VPN), wireless networks (using 802.11, for example), cellular networks (using 3G and/or LTE, for example), etc. . . . . In some configurations, network 240 may include the Internet.

In some embodiments server 250 may be coupled to database 260. Database 260 may include any type of data related to wireless communication systems. In some embodiments database 260 includes location information relating to one or more wireless communication access points. In some embodiments database 260 includes location information specific to one or more wireless communication access points. In some embodiments database 260 includes operating characteristic information relating to one or more wireless communication access points. In some embodiments database 260 includes operating characteristic information specific to one or more wireless communication access points. In some embodiments database 260 includes location information and operating characteristic information relating to one or more wireless communication access points. Database 260 may be internal or external to the server 250. In one example, apparatus 210 may be coupled directly to database 260, with database 260 being internal or external to apparatus 210.

In some embodiments apparatus 210 may be able to receive information from one or more of apparatus 220, 230, or others—through network 240, one or more apparatus, or by some combination. In some embodiments apparatus 210 may be able to send and/or receive information from one or more wireless access points. In some embodiments apparatus 210 may be able to send and/or receive information from one or more of apparatus 220, 230, and/or others.

Figure 3:
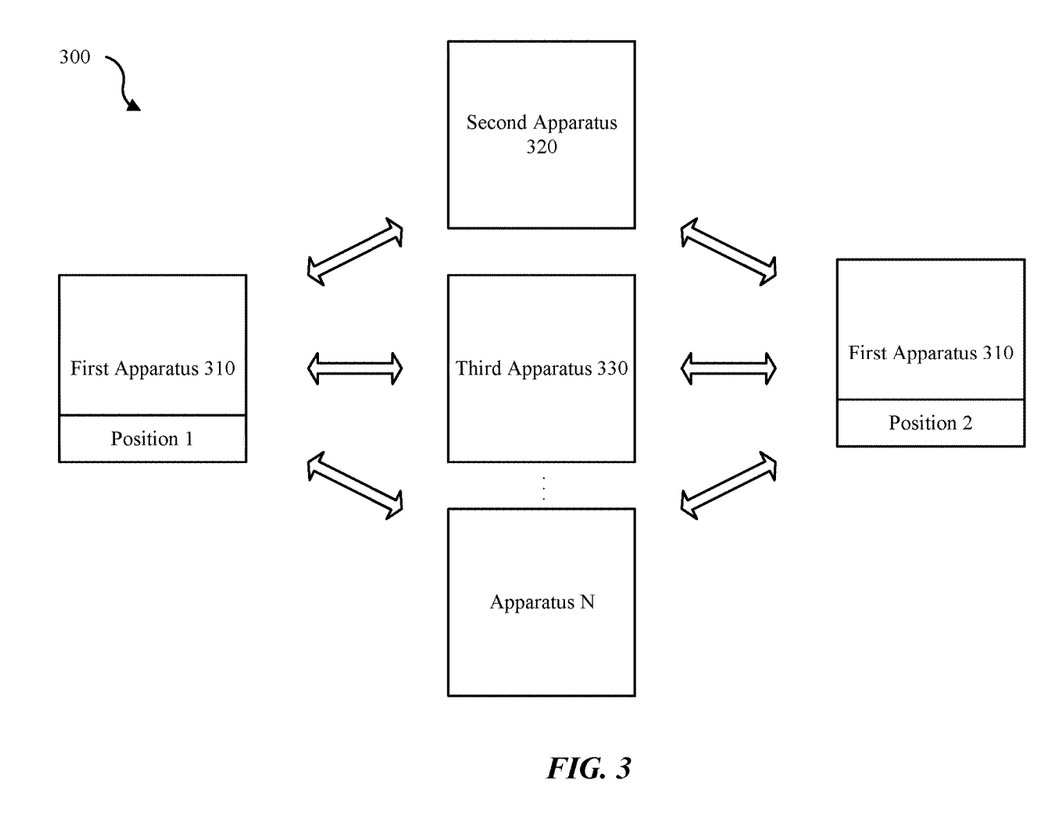
FIG. 3 is a block representation of exemplary apparatus and methods of organization in which the present systems and methods may be implemented, including using one or more locations.

FIG. 3 is a block representation of exemplary apparatus and methods of organization in which the present systems and methods may be implemented, including using one or more locations. In some embodiments a first apparatus 310, a second apparatus 320, a third apparatus 330, and others may include some or all of the characteristics discussed here with respect to apparatus 100 and/or apparatus 210. In other embodiments apparatus 310, 320, 330, and others may include entirely different characteristics than apparatus 100 and/or apparatus 210.

In some embodiments apparatus 310 may be able to receive information from one or more wireless access points. In some embodiments apparatus 310 may be able to receive information from one or more of apparatus 320, 330, and/or others. In some embodiments apparatus 310 may be able to send and/or receive information from one or more wireless access points. In some embodiments apparatus 310 may be able to send and/or receive information from one or more of apparatus 320, 330, and/or others.

In some embodiments apparatus 310 may be able to be moved from a first position to a second position. Apparatus 310 may be able to send and/or receive information from one or more wireless communication access points at one or more positions. For example, apparatus 310 may be able to send and/or receive information from one or more wireless communication access points at a first position, be moved to a second position, and then send and/or receive information from one or more wireless communication access points.

In some embodiments apparatus 310 may be moved during installation, a test phase, and/or before it is fully operational. This may occur when a user is installing apparatus 310 when one or more different wireless communication access points are already functioning within a certain distance or based on another parameter.

In some embodiments apparatus 310 may be moved based on certain information determined, received, correlated, or based on one or more adjustments made with apparatus 310 at a first position. In some embodiments this information may relate solely to apparatus 310. In other embodiments this information may relate solely to apparatus other than apparatus 310, such as apparatus 320, 330, and/or others. In some embodiments apparatus 310 may be moved based on certain information determined, received, and/or correlated, by one or more apparatus that may or may not include apparatus 310.

In some embodiments information may be determined, received, and/or correlated with apparatus 310 at a second position. This process may be repeated until the process yields the desired results.

Figure 4:
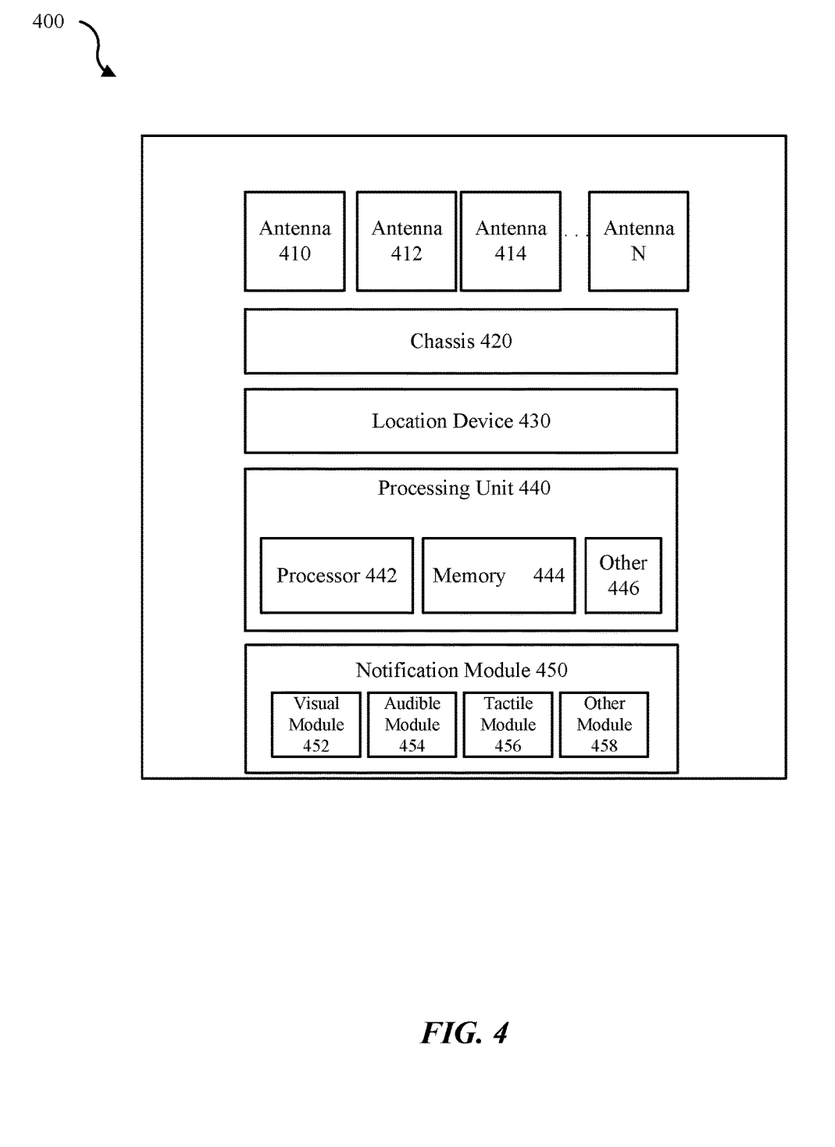
FIG. 4 is a block representation of exemplary apparatus and methods of organization in which the present systems and methods may be implemented, including a notification module.

FIG. 4 is a block representation of exemplary apparatus and methods of organization in which the present systems and methods may be implemented, including a notification module. In some embodiments apparatus 400 may include some or all of the characteristics discussed here with respect to apparatus 100, apparatus 210, apparatus 310, 320, 330, and/or others. In other embodiments apparatus 400 may include entirely different characteristics than apparatus 100, apparatus 210, apparatus 310, 320, 330, and/or others.

In some embodiments apparatus 400 may include a notification module 450. This notification module 450 may be in electronic communication with one or more components of apparatus 400 including, but not limited to antennas 410, 412, 414 or others, chassis 420, location device 430, processing unit 440, processor 442, memory 444, and/or other unit 446.

In some embodiments notification module 450 may include or be able to communicate with one or more other modules. These other modules may include, but are not limited to, a visual module 452, an audible module 454, a tactile module 456, and/or other module 458. These modules may be able to receive and/or send information to one or more components of apparatus 400. In some embodiments these modules may be able to send information to processing unit 440. In some embodiments these modules may be able to receive information from processing unit 440. Receiving information from processing unit 440 may include receiving information that has been determined, separately received, correlated, and/or otherwise compiled. In some embodiments notification module 450 may be able to receive one or more signals from processing unit 440 and then activate one or more modules. For example, notification module 450 may be able to activate visual module 452 based on certain information that had been determined, received, correlated, and/or otherwise processed. In some embodiments notification module 450 may be able to communicate with or dictate function of one or more modules—such as activating visual module 452 and tactile module 456—based on certain information that had been determined, received, correlated, and/or otherwise processed.

Visual module 452 may provide visual information to a user automatically or based at least in part on a signal or other information coming from notification module 450. In some embodiments visual module 452 may include visual information in the form or different colors, intensities, icons, symbols, sizes, patterns (e.g., blinking patterns), and/or other visual-based information. In some embodiments visual module 452 may include one or more LED lights. These one or more LED lights may illuminate with certain characteristics including, but not limited to, color, intensity, size, pattern (e.g., blinking pattern), or other visual-based information. This visual information may be given one time, multiple times, repeated over specific time intervals, based on an interval selected by a user, based on an interval at least partly set from user input, or assigned based on one or more operating characteristics.

Audible module 454 may provide audible information to a user automatically or based at least in part on a signal or other information coming from notification module 450. This audible information may include a notification, an instruction, an alert, a summary, or other information relating to one or more wireless communication access points. For example, the audible information may include notifying a user of certain location information or operating characteristic information, such as the existence of a certain signal strength, the distance of another wireless communication access point, or a channel of another wireless communication access point. This audible information may be given one time, multiple times, repeated over specific time intervals, based on an interval selected by a user, based on an interval at least partly set from user input, or assigned based on one or more operating characteristics.

Tactile module 456 may provide tactile information to a user automatically or based at least in part on a signal or other information coming from notification module 450. This tactile information may include a notification, an instruction, an alert, a summary, or other information relating to one or more wireless communication access points. For example, the audible information may include alerting a user of certain location information or operating characteristic information, such as the existence of a certain signal strength, the distance of another wireless communication access point, or a channel of another wireless communication access point. This tactile information may include a vibration, a pulsing, and/or other notification. This tactile information may be given one time, multiple times, repeated over specific time intervals, based on an interval selected by a user, based on an interval at least partly set from user input, or assigned based on one or more operating characteristics.

Notification module 450 may provide one or more notifications through one or more of visual module 452, audible module 454, tactile module 456, or other module 458.

Figure 5:
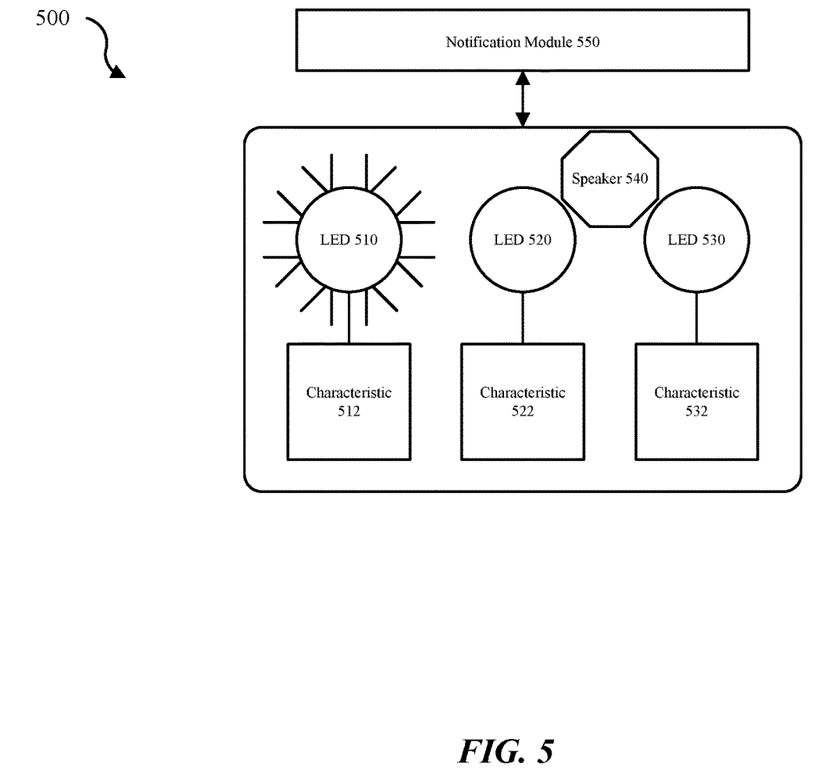
FIG. 5 is a block representation of exemplary apparatus and method of organization and communication in which the present systems and methods may be implemented.

FIG. 5 is a block representation of exemplary apparatus and method of organization and communication in which the present systems and methods may be implemented. In some embodiments apparatus 500 may include some or all of the characteristics discussed here with respect to apparatus 100, apparatus 210, apparatus 310, 320, 330, 400, and/or others. In other embodiments apparatus 500 may include entirely different characteristics than apparatus 100, apparatus 210, apparatus 310, 320, 330, 400, and/or others.

Apparatus 500, as shown in FIG. 5, may include notification module 550. This notification module 550 may send and receive certain information. In some embodiments notification module 550 receives information and then sends the information to another component of apparatus 500. In some embodiments notification module 550 receives information and then sends a signal based at least in part on the received information to another component of apparatus 500. As an example, notification module 550 may send a signal to one or more of LEDs 510, 520, and/or 530. In some embodiments each of LEDS 510, 520, and 530 may receive information about one or more characteristics. In some embodiments these characteristics may be the same for each of LEDs 510, 520, and 530, while in others each LED may receive a different characteristic. In some embodiments these characteristics may be signals sent from notification module 550.

In some embodiments characteristics 512, 522, and 532 may include information pertaining to a color. For example, based on a received characteristic LED 510 may light red, yellow, or green. In some embodiments each of LEDs 510, 520, and 530 may receive different characteristics, and in response, illuminate with a different color. In other embodiments only one LEDs like LED 510 may illuminate.

In some embodiments LEDs 510, 520, and 530 may illuminate with varying intensities. In some embodiments LEDs 510, 520, and 530 may illuminate with all different intensities. In other embodiments LEDs 510, 520, and 530 may illuminate with all similar or the same intensities.

In some embodiments LEDs 510, 520, and 530 may illuminate over varying intervals. In some embodiments LEDs 510, 520, and 530 may illuminate with all different intervals. For example, LED 510 may blink in a repeating pattern, illuminate constantly, or may illuminate based on a signal received by notification module 550. For example one or more LEDs may illuminate based on the strength of a certain signal received from notification module 550 or another component of apparatus 500.

In some embodiments LEDs 510, 520, and 530 may illuminate with varying blinking patterns. In some embodiments LEDs 510, 520, and 530 may illuminate with all different patterns and may act independently of one another. In other embodiments LEDs 510, 520, and 530 may illuminate together at the same time or successively such as LED 510 illuminating, then LED 520 illuminating, and then LED 530 illuminating. Apparatus 500 may include other variations of blinking patterns.

In some embodiments LEDs 510, 520, and 530 may illuminate in a pattern varying intensities. In some embodiments LEDs 510, 520, and 530 may illuminate with all different intensities. In other embodiments LEDs 510, 520, and 530 may illuminate with all similar or the same intensities. In some embodiments LEDs 510, 520, and 530 may illuminate based on a signal or corresponding characteristics (i.e., 512, 522, and/or 532) received. In some embodiments at least one LED may illuminate based on information determined, received, correlated, and/or measured relating to apparatus 500 or one or more wireless communication access points. For example, at least one LED may illuminate based on information location and/or performance operating information relating to apparatus 500 or one or more wireless communication access points.

In some embodiments notification module 550 receives information and then sends a signal based at least in part on the received information to another component of apparatus 500. As an example, notification module 550 may send a signal to speaker 540. In some embodiments this signal may include a chime, musical notes, and/or recordings including computer or user-generated voice commands or notifications.

Figure 6:
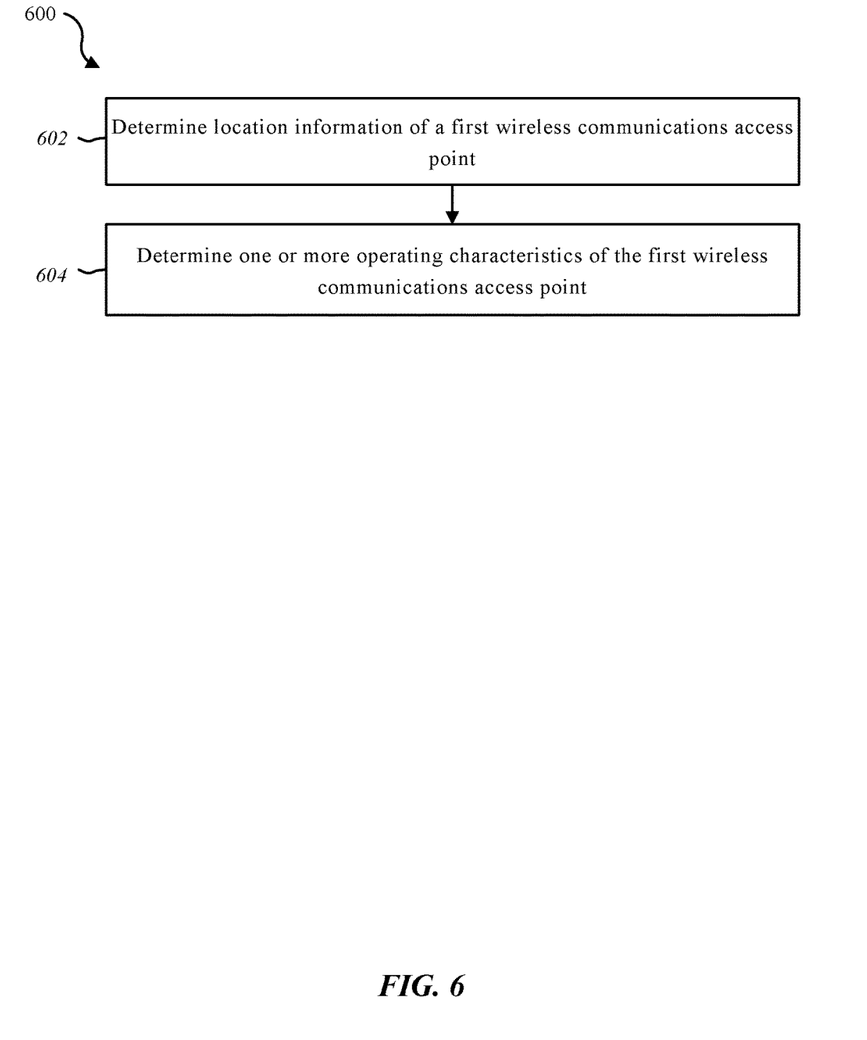
FIGS. 6-8 depict block diagrams of exemplary methods that may be performed in accordance with this disclosure.
Figure 7:
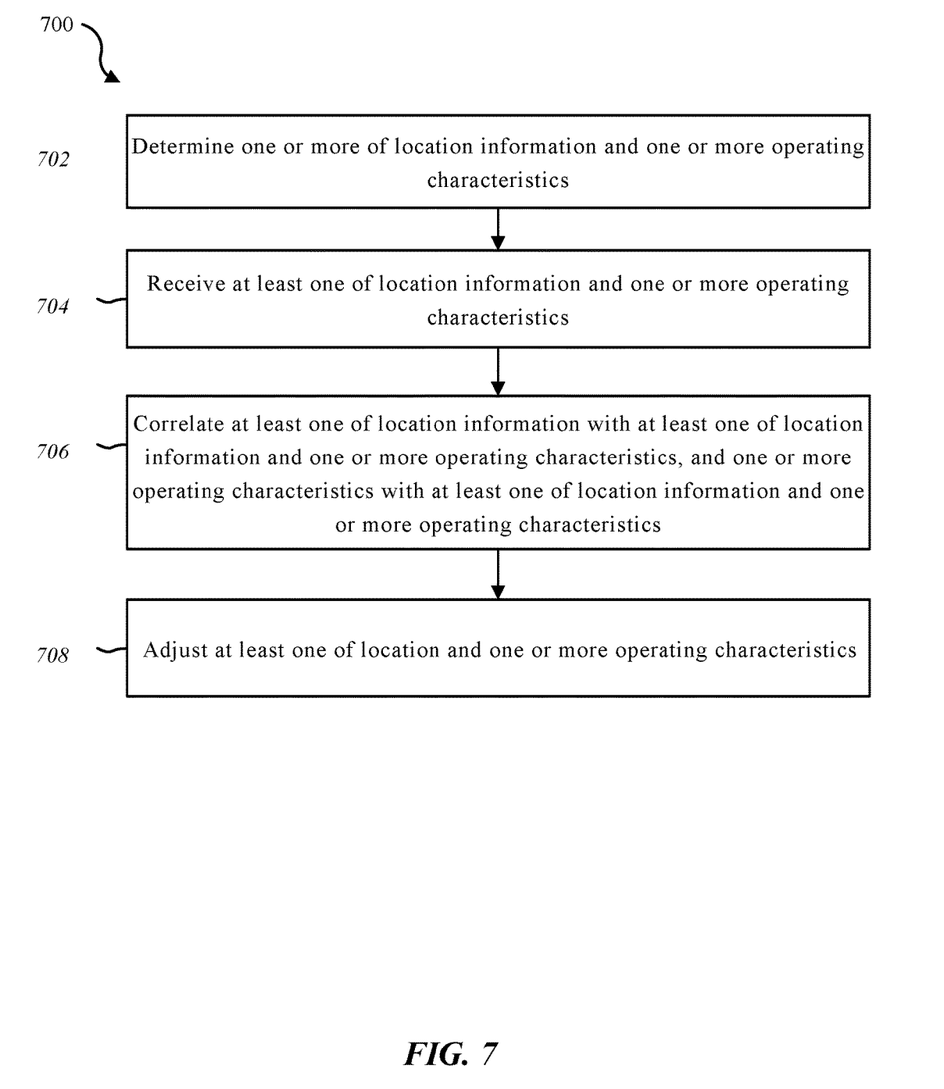
Figure 8:
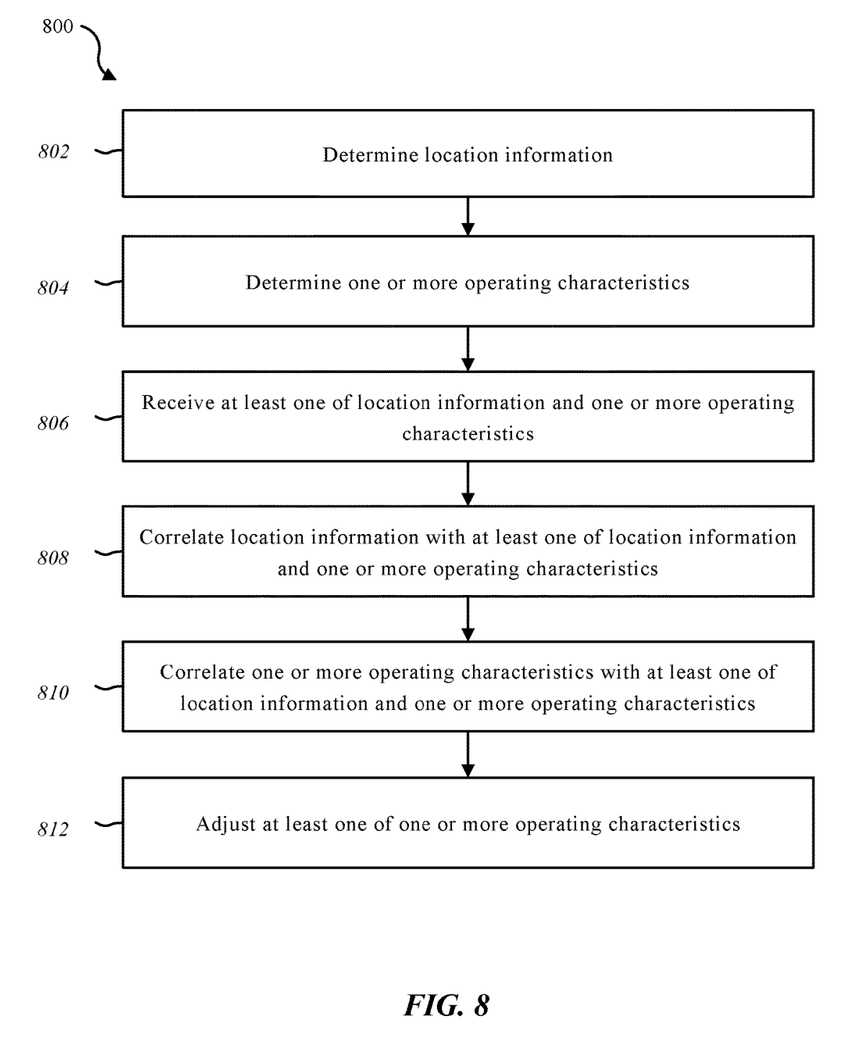

FIGS. 6-8 depict block diagrams of exemplary methods that may be performed in accordance with this disclosure. These block diagrams serve only as examples. The present method described herein may be performed in the order described or not in the order described—and this disclosure must not be limited to that shown in these figures. Some, all, or none of the steps shown in these figures may be performed, which can be readily adapted based on the this disclosure including the claims and/or the figures. Any reference to a specific structure (e.g., a first wireless communication access point) must not be limited to only the discussion of that structure. Any discussion pertaining to one structure or method disclosed may also pertain to another structure or method disclosed. In some embodiments one part of the method may be performed as a result of another part of the method. In other embodiments one part of the method may be performed independent of all other parts of the method. In some embodiments parts of the method may be performed together because they relate to similar information (e.g., location information) or affect similar information (e.g., operating characteristics).

FIG. 6 depicts a block diagram showing an exemplary method. Method 600 may include determining location information of a first wireless communication access point and determining one or more operating characteristics. Determining location information may be performed by any apparatus, such as a first wireless communication access point or one or more other wireless communication access points, a network, using a network connection, and/or some combination of these. In some embodiments determining location information of a first wireless communication access point is performed at or by the first wireless communication access point itself. In some embodiments determining location information is performed by one or more components of an apparatus, such as apparatus 100, including location device 130 and processing unit 140.

In some embodiments determining location information may include determining the location of a wireless communication access point using GPS coordinates or any other method that may provide a relative position. In some embodiments determining location information may include determining the relative location of a wireless communication access point relative to one or more other structures or items, including other wireless communication access points. In some embodiments determining location information may include determining a distance between a first wireless communication access point and one or more other wireless communication access points. In some embodiments determining location information may include determining a height difference between a first wireless communication access point and one or more other wireless communication access points. In some embodiments determining location information may include determining one or more proximity values between a first wireless communication access point and one or more other wireless communication access points.

Determining one or more operating characteristics may be performed by any apparatus, such as a first wireless communication access point or one or more other wireless communication access points, a network, using a network connection, and/or some combination of these. In some embodiments determining one or more operating characteristics of a first wireless communication access point is performed at or by the first wireless communication access point itself. In some embodiments determining one or more operating characteristics is performed by one or more components of an apparatus, such as apparatus 100, including processing unit 140.

Operating characteristics may include, but are not limited to, signal strength, signal frequency, signal sensitivity, signal period, signal channel, interference amount, network connection identification, equipment type, provider identification, servicer identification, and/or other characteristics pertaining to wireless communication access points.

In some embodiments determining one or more operating characteristics may include using monitoring. This monitoring may be done by the wireless communication access point itself, by another wireless communication access point, using a network, thru a network connection, and/or some combination. In some embodiments this monitoring may include receiving certain types of operating characteristics or other information. For example, monitoring may include receiving information about a frequency of a first wireless communication access point at a first time and then receiving information using the same frequency at a second time. In some embodiments monitoring may include receiving information about a first frequency of a first wireless communication access point at a first time and then receiving information using a second frequency at a second time. Monitoring may include noting certain operating characteristics based at least in part on using the first frequency compared to the second frequency.

In some embodiments determining one or more operating characteristics may include performing calculations. These calculations may be done by the wireless communication access point itself, by another wireless communication access point, using a network, thru a network connection, and/or some combination. In some embodiments these calculations process information received and calculate how one or more wireless communication access points is performing. For example, a calculation may include receiving information about a signal strength of a first wireless communication access point and then calculating an ideal or a desired signal strength based on the current signal strength. In some embodiments a calculation may include calculating a current signal strength based on certain utilized parameters like a frequency and then calculating a potential signal strength based on other parameters like a different frequency.

In some embodiments determining location information may include determining the relative location of a wireless communication access point relative to one or more other structures or items, including other wireless communication access points. In some embodiments determining location information may include determining a distance between a first wireless communication access point and one or more other wireless communication access points. In some embodiments determining location information may include determining a height difference between a first wireless communication access point and one or more other wireless communication access points.

FIG. 7 depicts a block diagram showing an exemplary method. Method 700 may include determining one or more of location information and one or more operating characteristics, receiving at least one of location information and one or more operating characteristics, correlating at least one of location information with at least one of location information and one or more operating characteristics, and one or more operating characteristics with at least one of location information and one or more operating characteristics, and adjusting at least one of location and one or more operating characteristics.

In some embodiments determining one or more of location information and one or more operating characteristics may be performed as described above, and as shown in block 702. In some embodiments determining this information may take place at a specific first wireless communication access point, at one or more other wireless communication access points, via a network, or some combination. In some embodiments only location information or only operating characteristics may be determined. In other embodiments both location information and operating characteristics may be determined. In some cases the location information and operating characteristics may relate to different wireless communication access points or may relate to the same wireless communication access point or group of wireless communication access points.

In some embodiments at least one of location information and one or more operating characteristics may be received, as shown in block 704. This information may be received by the wireless communication access point itself, by another wireless communication access point, using a network, through a network connection, and/or some combination. For example, receiving may include receiving location information about one or more wireless communication access points relative to a first access point. Receiving may also include receiving information about a wireless communication access point at a first time and then receiving information at a second time. In some embodiments receiving may include receiving information about a first operating characteristics of a first wireless communication access point at a first time and then receiving information about the first operating characteristic at a second time. In some embodiments receiving may include receiving information about a first operating characteristics of a first wireless communication access point at a first time and then receiving information about the second operating characteristic at a second time.

In some embodiments certain information may be correlated with other information, as shown in block 706. This correlating may be performed by the wireless communication access point itself, by another wireless communication access point, using a network, through a network connection, and/or some combination. In some embodiments location information of a wireless communication access point may be correlated with at least one of location information of a wireless communication access point and one or more operating characteristics. In some embodiments one or more operating characteristics of a wireless communication access point may be correlated with at least one of location information of a wireless communication access point and one or more operating characteristics.

Any correlation may be performed for information pertaining to the same wireless communication access point, the same groups of wireless communication access points, or different wireless communication access points—such as a first and a second wireless communication access point.

In some embodiments information may be correlated with stored data. This stored data may be stored locally within a wireless communication access point, a different wireless communication access point, on a server, in a database, based on a table, or other variations. In some embodiments information may be correlated with received and/or determined data. This received and/or determined data may be specific to the device that is performing the correlation or may relate to other devices, such as one or more wireless communication access points, or some combination.

In some embodiments correlation of other types of information, not location or operating characteristic information, may be performed. These other types of information may include information relating to wireless communication access points, one or more networks, or other associate devices.

In some embodiments an adjustment may be made, as shown in 708. These adjustments may include adjusting one or more operating characteristics. In some embodiments adjustments may be made based on determining certain information, receiving certain information, correlating certain information, and/or other actions that may be performed related to wireless communication access points.

In some embodiments an adjustment may include adjusting the location of a wireless communication access point. This adjustment may be made by a user's physical movement of a portable wireless communication access point. In other embodiments this adjustment may be made by deactivating an initial wireless communication access point and then activating or reactivating the wireless communication access point using a second apparatus located at a second location.

In some embodiments an adjustment may include adjusting one or more operating characteristics of a wireless communication access point. By way of example only, an adjustment may be made to the operating frequency of a wireless communication access point. This adjustment may be made to alleviate and/or prevent CCI or ACI. This adjustment may be performed automatically, may require user input, may optionally require user confirmation, and/or some combination. In some embodiments the adjustment may be made automatically based on determined, received, correlated, or otherwise processed information. This automatic adjustment may be performed independent of any notification or alert sent by the system. For example, an apparatus may automatically adjust certain operating characteristics like signal sensitivity based on other information. Any adjustment may take place at the adjusted wireless communication access point, through a different wireless communication access point, through a server, through a database, and/or by some combination. Any adjustment may include adjusting one or more operating characteristics specific to one or more wireless communication access points. For example, an adjust may increase signal sensitivity of a first wireless communication access point and may change a signal frequency of a second wireless communication access point.

In some embodiments an adjustment may be based on stored data. In other embodiments an adjustment may be based on stored data and/or data received within a specified time period (i.e., a year, a month, a week, a day). In some embodiments an adjustment may be based on real-time monitored data (actual real-time or near real-time).

An adjustment may be made by a user's physical movement of a portable wireless communication access point. In other embodiments this adjustment may be made by deactivating an initial wireless communication access point and then activating or reactivating the wireless communication access point using a second apparatus located at a second location.

FIG. 8 depicts a block diagram showing an exemplary method. Method 800 may include determining location information, determining one or more operating characteristics, receiving at least one of location information and one or more operating characteristics, correlating at least one of location information with at least one of location information and one or more operating characteristics, correlating one or more operating characteristics with at least one of location information and one or more operating characteristics, and adjusting at least one of one or more operating characteristics.

In some embodiments one or more of the actions described in blocks 802-812 may be performed as a result of another action or may be performed regardless of another action. For example, an apparatus may correlate one or more operating characteristics with at least one of location information and one or more operating characteristics only if it has already correlated location information with at least one of location information and one or more operating characteristics. This may provide a way that certain steps of method 800, or any other disclosed in this disclosure, may not be performed unless prerequisites are met.

In some embodiments action described in certain blocks may be performed simultaneously or as one action. For example, block 802 describes determining location information and block 808 describes correlating location information with at least one of location information and one or more operating characteristics. The correlating action of block 808 may include determining location information and correlating the determined location information.

In some embodiments a signal or a notification may be sent based on one or more actions described in this disclosure, including FIGS. 6-8. In some embodiments this signal or notification may inform a user to adjust one or more of a location or one or more operating characteristics. For example, based on correlating location information with at least one of location information and one or more operating characteristics a signal or a notification may be sent via an LED. This signal or notification may alert a user of the correlation performed based at least in part on the location information. If a first wireless communication access point is within a predetermined distance of another wireless communication access point, then a visual signal—such as lighting a certain LED—may alert the user. As another example, based on correlating one or more operating characteristics with at least one of location information and one or more operating characteristics information with at least one of location information and one or more operating characteristics, a signal or a notification may be sent via an LED. This signal or notification may alert a user of the correlation. If a first wireless communication access point is within a predetermined distance of another wireless communication access point and a correlation about certain operating characteristics is performed, then a visual signal—such as lighting a certain LED or changing the intensity of an LED—may alert the user that an adjustment is needed and/or has been automatically performed.

In some embodiments, this disclosure may specifically apply to security system applications. In some embodiments, this disclosure may specifically apply to home or business automation system applications. For example, when installing a new access point for a home security and/or automation system, one or more of the methods and/or the apparatus disclosed here may be employed. Distinct advantages of such a system for these specific applications are apparent from this disclosure.

While this disclosure discusses various embodiments using specific block diagrams, flowcharts, and examples, each block diagram component, flowchart action, operation, and/or component described and/or illustrated may be implemented, individually and/or collectively, using a wide range of hardware, software, or firmware (or any combination thereof) configurations. In addition, any disclosure of components contained within other components or separate from other components should be considered exemplary because multiple other architectures may potentially be implemented to achieve the same functionality.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments these software modules may configure a computing system to perform one or more of the exemplary embodiments disclosed herein.

This description, for purpose of explanation, has been described with reference to specific embodiments. The illustrative discussions above, however, are not intended to be exhaustive or limit the invention to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least in part on."

What is claimed is:

1. A method for wireless communication, comprising:
   determining, by the first wireless access point, location information of the first wireless access point at a first location;
   determining, by the first wireless access point, an operating characteristic of the first wireless access point at the first location;
   receiving, by the first wireless access point, location information and an operating characteristic of a second wireless access point;
   correlating, by the first wireless access point, the location information of the first wireless access point with the location information of the second wireless access point;
   automatically selecting, by the first wireless access point, a second location to position the first wireless access point based at least in part on the correlating, wherein the second location is different from the first location; and
   transmitting, by the first wireless access point to a network, an indication of the selected second location and instructions for the network to adjust the operating characteristic of the second wireless access point,
   wherein the first wireless access point and the second wireless access point are different.

2. The method of claim 1, further comprising:
   deactivating the first wireless access point based at least in part on the selecting;
   positioning the first wireless access point at the second location; and
   reactivating the first wireless access point based at least in part on the positioning.

3. The method of claim 2, wherein the deactivating of the first wireless access point is at the first location, and reactivating the first wireless access point is at the second location.

4. The method of claim 1, further comprising:
   comparing the operating characteristic of the first wireless access point with the operating characteristic of the second wireless access point, wherein selecting the second location to position the first wireless access point is based at least in part on the comparing.

5. The method of claim 1, further comprising:
   adjusting the operating characteristic of the first wireless access point at the first location based at least in part on the correlating.

6. The method of claim 5, wherein the operating characteristic of the first wireless access point comprises a first signal strength associated with communicating on a first frequency channel of the first wireless access point.

7. The method of claim 6, wherein the operating characteristic of the second wireless access point comprises a second signal strength associated with communicating on a second frequency channel of the second wireless access point, wherein the first frequency channel and the second frequency channel are different.

8. The method of claim 5, further comprising:
   determining an interference value between the first wireless access point communicating on a first frequency channel and the second wireless access point communicating on a second frequency channel;
   determining a signal strength associated with communicating on the first frequency channel of the first wireless access point at the first location based at least in part on the determining; and identifying that the signal strength is below a threshold signal strength value based at least in part on the determining, wherein adjusting the operating characteristic of the first wireless access point is based at least in part on the signal strength being below the threshold signal strength value.

9. The method of claim 8, wherein the interference value comprises a value indicating how the second wireless access point interferes with the operating characteristic of the first wireless access point.

10. The method of claim 8, wherein the signal strength is associated with at least a subset of antennas of a plurality of antennas associated with the first wireless access point.

11. The method of claim 10, wherein adjusting the operating characteristic of the first wireless access point further comprises:

adjusting a signal characteristic associated with the subset of antennas of the plurality of antennas to maintain the operating characteristic of the first wireless access point.

12. The method of claim 2, further comprising:

determining a distance between the first wireless access point and the second wireless access point based at least in part on the location information of the first wireless access point and the received location information of the second wireless access point, wherein selecting the second location to position the first wireless access point based at least in part on the distance.

13. The method of claim 1, further comprising:

determining a height difference between the first wireless access point and the second wireless access point based at least in part on the location information of the first wireless access point and the received location information of the second wireless access point.

14. The method of claim 1, further comprising:

providing instructions to adjust a location, or an operating characteristic, or both of the first wireless access point, wherein the instructions comprises at least one of visual information, audible information, or tactile information, or a combination thereof.

15. A non-transitory computer-readable medium storing computer executable code, the code executable by a processor of first wireless access point to:

determine, by the processor of the first wireless access point, location information of a first wireless access point at a first location;

determine, by the processor of the first wireless access point, an operating characteristic of the first wireless access point at the first location;

receive, by the processor of the first wireless access point, location information and an operating characteristic of a second wireless access point;

correlate, by the processor of the first wireless access point, the location information of the first wireless access point with the location information of the second wireless access point; and automatically select, by the processor of the first wireless access point, a second location to position the first wireless access point based at least in part on the correlating, wherein the second location is different from the first location; and transmit, by the first wireless access point to a network, an indication of the selected second location and instructions for the network to adjust the operating characteristic of the second wireless access point, wherein the first wireless access point and the second wireless access point are different.

16. The non-transitory computer-readable storage medium of claim 15, the code further executable to: deactivate the first wireless access point based at least in part on the selecting; position the first wireless access point at the second location; and reactivate the first wireless access point based at least in part on the positioning.

17. The non-transitory computer-readable storage medium of claim 16, wherein the deactivation of the first wireless access point occurs at the first location, and reactivation of the first wireless access point occurs at the second location.

18. The non-transitory computer-readable storage medium of claim 16, the code further executable to:

comparing the operating characteristic of the first wireless access point with the operating characteristic of the second wireless access point, wherein selecting the second location to position the first wireless access point is further based at least in part on the comparing.

19. The non-transitory computer-readable storage medium of claim 15, the code further executable to:

adjusting the operating characteristic of the first wireless access point at the first location based at least in part on the correlating.

20. A wireless communication system, comprising:

a first wireless access point configured to:

determine location information of the first wireless access point at a first location;

determine an operating characteristic of the first wireless access point at the first location;

receive location information and an operating characteristic of a second wireless access point;

correlate the location information of the first wireless access point with the location information of the second wireless access point; and automatically select a second location to position the first wireless access point based at least in part on the correlating, wherein the second location is different from the first location; and transmit, to a network, an indication of the selected second location and instructions for the network to adjust the operating characteristic of the second wireless access point, wherein the first wireless access point and the second wireless access point are different.

* * * * *